(12) United States Patent
Liu

(10) Patent No.: US 7,445,706 B2
(45) Date of Patent: Nov. 4, 2008

(54) PROTEIN SKIMMER

(76) Inventor: Chun-Chieh Liu, No. 241, Feiji Road, Siaogang District, Kaohsiung (TW)

( * ) Notice: Subject to any disclaimer, the term of this patent is extended or adjusted under 35 U.S.C. 154(b) by 0 days.

(21) Appl. No.: 11/766,696

(22) Filed: Jun. 21, 2007

(65) Prior Publication Data
US 2008/0006569 A1 Jan. 10, 2008

(30) Foreign Application Priority Data
Jul. 4, 2006 (TW) .............................. 95211725 U

(51) Int. Cl.
*A01K 63/04* (2006.01)
*C02F 1/40* (2006.01)
(52) U.S. Cl. ..................... 210/167.21; 210/167.26; 210/905
(58) Field of Classification Search ............ 210/167.21, 210/167.26, 905, 776; 119/263
See application file for complete search history.

(56) References Cited
U.S. PATENT DOCUMENTS

| | | | | |
|---|---|---|---|---|
| 3,616,919 A | * | 11/1971 | Feddern et al. | 210/167.25 |
| 3,957,017 A | * | 5/1976 | Carmignani et al. | 119/227 |
| 4,972,801 A | * | 11/1990 | Hunt | 119/215 |
| 5,078,867 A | * | 1/1992 | Danner | 210/167.22 |
| 5,380,160 A | * | 1/1995 | Chen | 417/65 |
| 5,665,227 A | * | 9/1997 | Watt | 210/167.26 |
| 5,800,704 A | * | 9/1998 | Hansen | 210/167.21 |
| 6,303,028 B1 | * | 10/2001 | Marks et al. | 210/167.27 |

* cited by examiner

*Primary Examiner*—Fred Prince
(74) *Attorney, Agent, or Firm*—Cahn & Samuels, LLP.

(57) ABSTRACT

A protein skimmer for filtering and cleaning water in an aquarium having a foam generating assembly having an air chamber (73) and a nozzle (74) in the air chamber, the nozzle being provided with a plurality of air holes (741) and being connected to an inlet tube (71), the inlet tube communicating with a foam cavity within a vertical guide tube (20) for foam, the guide tube (20) generally being tapered as a whole and including an open upper end (202), a bottom end (203) and a hollow cone-shaped circumferential wall being formed between the upper end and the bottom end and encircling the foam cavity (21) thereby tapering toward and communicating with the upper end (202).

2 Claims, 6 Drawing Sheets

PROTEIN SKIMMER

This patent application claims priority under 35 U.S.C. §119 to Taiwanese patent application number 095211725 filed on Jul. 4, 2006.

I. FIELD OF THE INVENTION

The present invention relates to a protein skimmer used to filter and clean water in an aquarium and to a foam generating assembly and a guide tube for foam that efficiently guide bubbles created by the protein skimmer to improve filtering efficiency of the protein skimmer to a collection reservoir.

II. BACKGROUND OF THE INVENTION

With reference to FIG. 6, a conventional guide tube (80) in accordance with the prior art is cylindrical and is used in a conventional protein skimmer. The conventional protein skimmer removes protein and suspended solids from aquarium water and has a basin (70), a foam generating assembly, a water valve (77), a guide tube (80), a mid cover (89) and a collecting assembly.

The basin (70) has a top, a circumferential wall, an inlet (72), an outlet (78) and a guide opening (79). The inlet (72) is formed through the top of the basin (70). The outlet (78) is formed through the circumferential wall of the basin (70). The guide opening (79) is formed through the top of the basin (70) near the inlet (72).

The foam generating assembly receives a flow of water contaminated with protein and suspended solids from an aquarium, injects minute bubbles into the flow of water, is connected to the inlet (72) of the basin (70) and has a connecting tube (76), a nozzle (74), an inlet tube (71), an air chamber (73) and an air valve (75). The connecting tube (76) has an outer end and an inner end. The outer end is connected to a submersible pump that pumps water from the aquarium into the connecting tube (76). The nozzle (74) is connected to the inner end of the connecting tube (76) and has a circumferential wall, an inner end and multiple air holes (741). The air holes (741) are formed through the circumferential wall of the nozzle (74) to allow air to pass into the nozzle (74) and mix with water in the nozzle (74) to generate the minute bubbles. Impurities suspended in the water, e.g. protein or other suspended particles adhere respectively to surface of the bubbles by surface tension of the bubbles and form foam that is carried with the water afflux.

The inlet tube (71) is connected to the outlet end of the nozzle (74) and has a bottom end. The bottom end of the inlet tube (71) is mounted in the inlet (72) in the upper wall of the basin (70) to allow the water containing the foam to pass into the basin (70).

The air chamber (73) is mounted around the nozzle (74), forms an airtight space around the air holes (741) in the nozzle (74) and has a circumferential wall and a mounting hole. The mounting hole is formed through the circumferential wall of the air chamber (73).

The air valve (75) is mounted in the mounting hole in the air chamber (73), is connected to an air pump, allows air to be pumped into the air chamber (73) and has a bottom end. The bottom end of the air valve (75) is mounted through the mounting hole in the air chamber (73) with an airtight fit such that air pumped into the air chamber (73) is sucked through the air holes (741) into the nozzle (74) by the water afflux passing through the nozzle (74) and is mixed with said water to form minute bubbles.

The water valve (77) is connected to the outlet (78) of the basin (70) to control the discharge of filtered water from the basin (70).

The guide tube (80) is cylindrical, is mounted on the upper wall of the basin (70), collects foam that rises from the basin (70) and has a lower end and an upper end. The lower end of the guide tube (80) is mounted in the guide opening (79) in the basin (70). Foam in the water in the basin (70) floats up through the guide opening (79) and accumulates in, fills and passes out of the upper end of the guide tube (80).

The mid cover (89) is mounted on the upper end of the guide tube (80) and has a mounting hole. The mounting hole is formed through the mid cover (89).

The collecting assembly is connected to the upper end of the vertical guide tube (80) and has an extension tube (83), a collection reservoir (82), a top cover (85) and a drain fitting (84). The extending tube (83) is smaller than the guide tube (80) and has a bottom end and an upper end. The bottom end of the extending tube (83) is mounted in the mounting hole in the mid cover (89), communicates with guide tube (80) and receives foam from the guide tube (80).

The collection reservoir (82) is mounted around the upper end section of the extending tube (83) and has an open top, a bottom, a circumferential wall and a drain hole. The drain hole is formed through the circumferential wall of the collection reservoir (82). The foam is continuously accumulated and rises until the foam spills out of the upper end of the extending tube (83) and settles in the collection reservoir (82). As the foam in the collection reservoir (82) transitions back to the water, impurities bonded to the foam are suspended in the water in the collection reservoir (82). Thus, impurities are filtered from the water and are collected in the collection reservoir (82).

The top cover (85) is mounted on the open top of the collection reservoir (82) and has an air hole. The air hole is formed through the top cover (85) to allow air released from the foam to escape.

The drain fitting (84) is mounted in the drain hole in the collection reservoir (82) to selectively draw off water and suspended impurities collected in the collection reservoir (82).

However, the mid cover (89) is backing up the foam in the guide tube (80) and causes most of the foam to collapse and reintroduce the impurities back into the water in the guide tube (80) and the basin (70) before the foam arrives at the upper end of the guide tube (80). Thus, the filtering efficiency of the conventional protein skimmer is reduced significantly.

III. SUMMARY OF THE INVENTION

The present invention provides a protein skimmer with a guide tube to diminish or obviate the aforementioned problems.

The invention solves the problem by providing a protein skimmer for improving the filtering efficiency.

The protein skimmer according to the invention for filtering and cleaning water in an aquarium comprises a foam generating assembly having an air chamber and a nozzle in said air chamber, the nozzle being provided with a plurality of air holes and being connected to an inlet tube, said inlet tube communicating with a foam cavity formed by the inside of a guide tube.

The guide tube according to the invention is mounted between a foam generating assembly and a collecting assembly of the protein skimmer, has an overall tapered or conical shape and comprises a circumferential wall, an upper end, a bottom end, a tapered or conical foam cavity formed by the interior space encircled by the tapered or conical circumferential wall, and a base plate.

The upper end of the tapered or conical foam cavity is open and connects smoothly and without obstacles to the collection assembly and communicates therewith. The circumferential wall is formed between the upper end and the bottom end and encircles the foam cavity which, accordingly, tapers toward the upper end and communicates therewith. The base plate is mounted on and closes the bottom end of the guide tube.

As the guide tube is substantially tapered throughout at least the biggest part of its length up to the upper end of the guide tube, bubbles in the foam within the guide tube get closer and closer to each other and gradually combine with each other to form larger bubbles as they rise. Therefore, most of the bubbles are kept from bursting until they spill out of the upper end of the guide tube. Accordingly, most of the impurities bonded to the bubbles are being brought to and collected in the collecting assembly, thus improving the filtering efficiency of the protein skimmer.

Furthermore, the guide tube is substantially tapered, having a smooth transition on the inside of its upper end into the collecting assembly, so that no distinct, restricting and constricting connections exists between the upper end of the guide tube and the collecting assembly, the foam thus being transported smoothly into the collecting assembly, which further improves the filtering efficiency of the protein skimmer.

The invention, including preferred embodiments of the invention, becomes apparent from the following detailed description in connection with the annexed drawings which supplement the description.

IV. BRIEF DESCRIPTION OF THE DRAWINGS

V. DETAILED DESCRIPTION OF THE INVENTION

Figure 4:
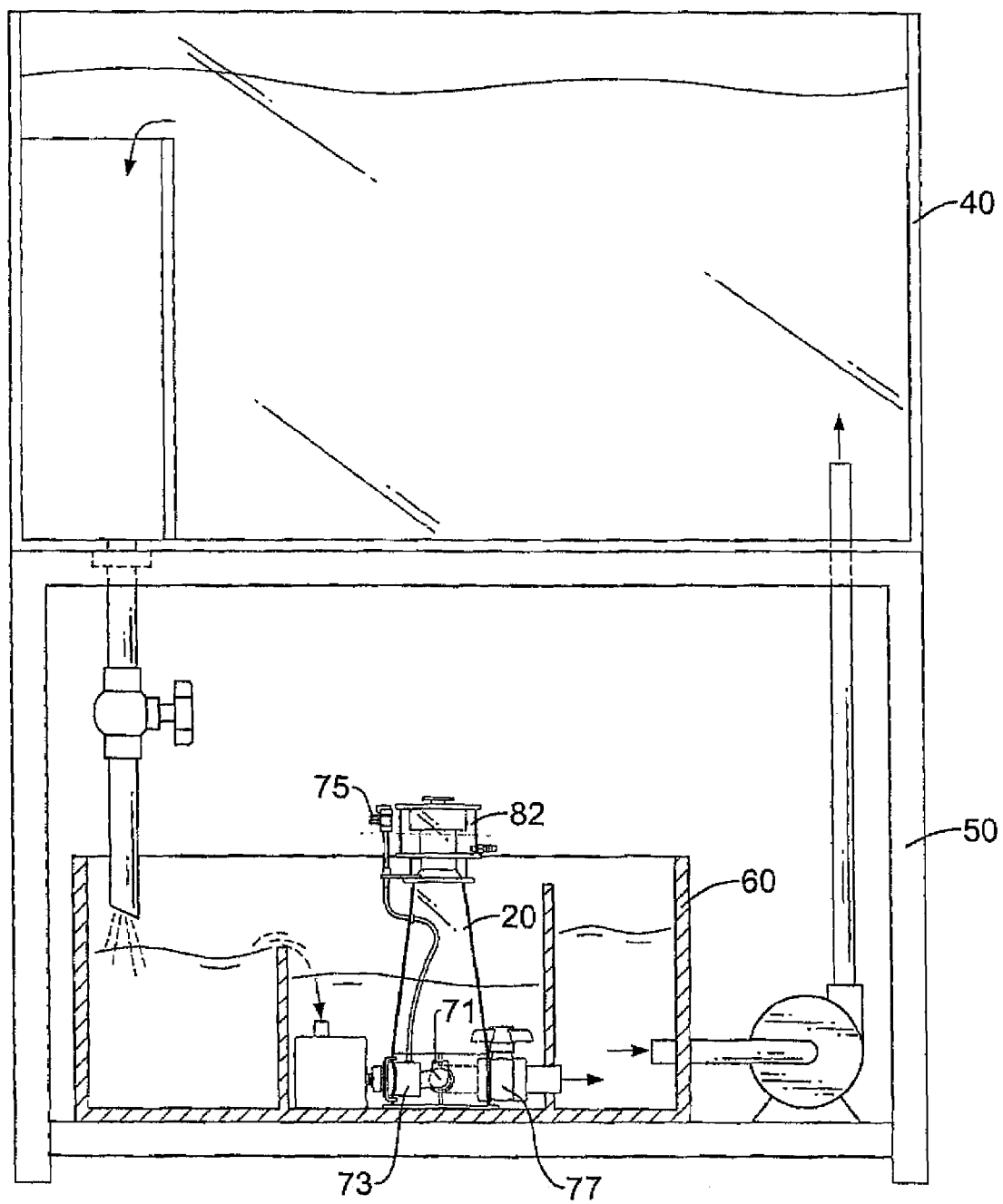
FIG. 4 is an operational front view in partial section of the protein skimmer in FIG. 1.

From FIG. 4, a protein skimmer with a vertical tapered or conical guide tube (20) according to the invention can be taken which is used in a protein skimmer to efficiently filter impurities, including protein and suspended particles, out of water from an aquarium (40). The protein skimmer is mounted in a reservoir (60) in a conventional aquarium cabinet (50).

Figure 1:
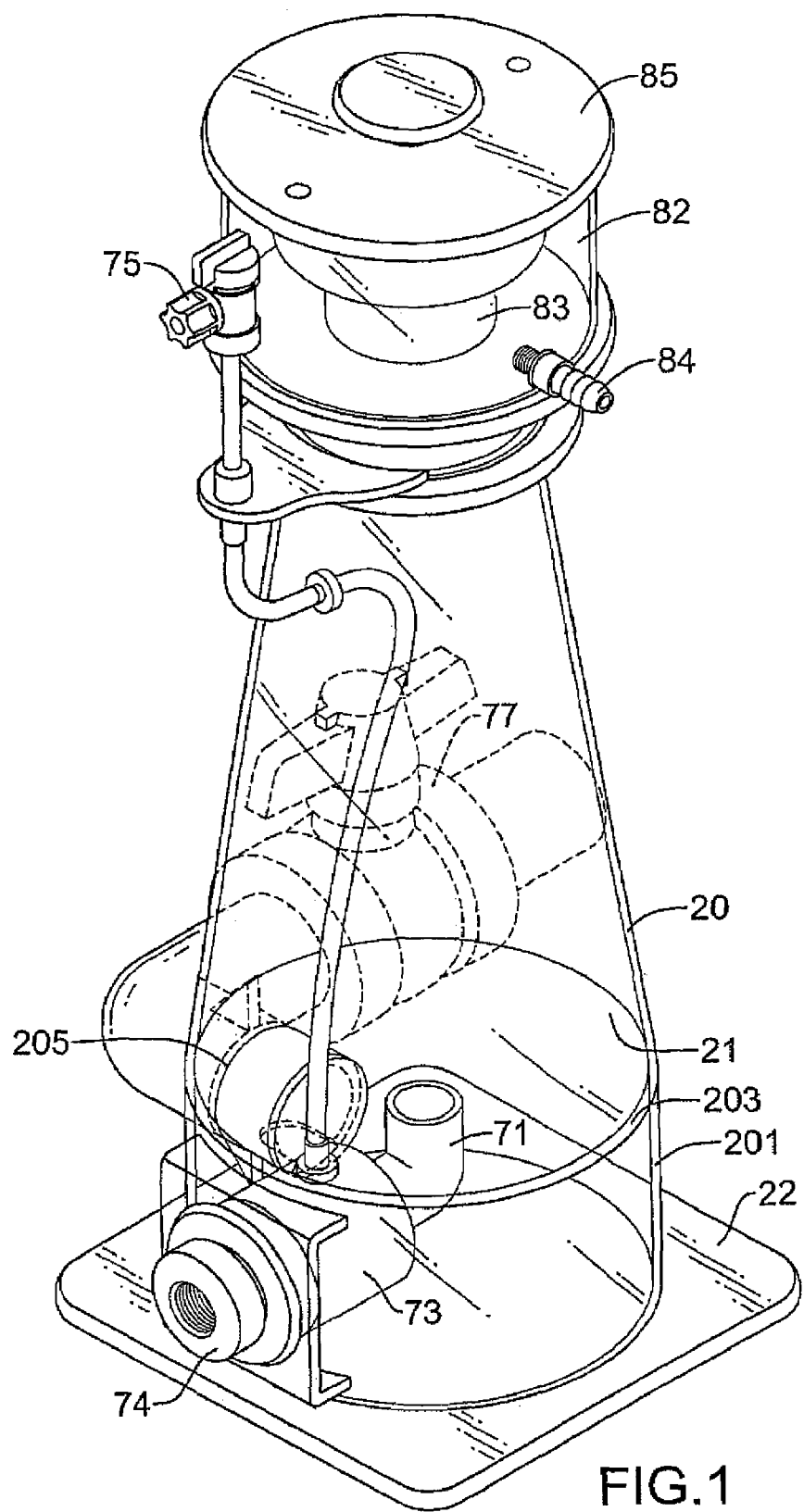
FIG. 1 is a perspective view of a protein skimmer with a guide tube according to the invention, mounted in a protein skimmer.
Figure 2:
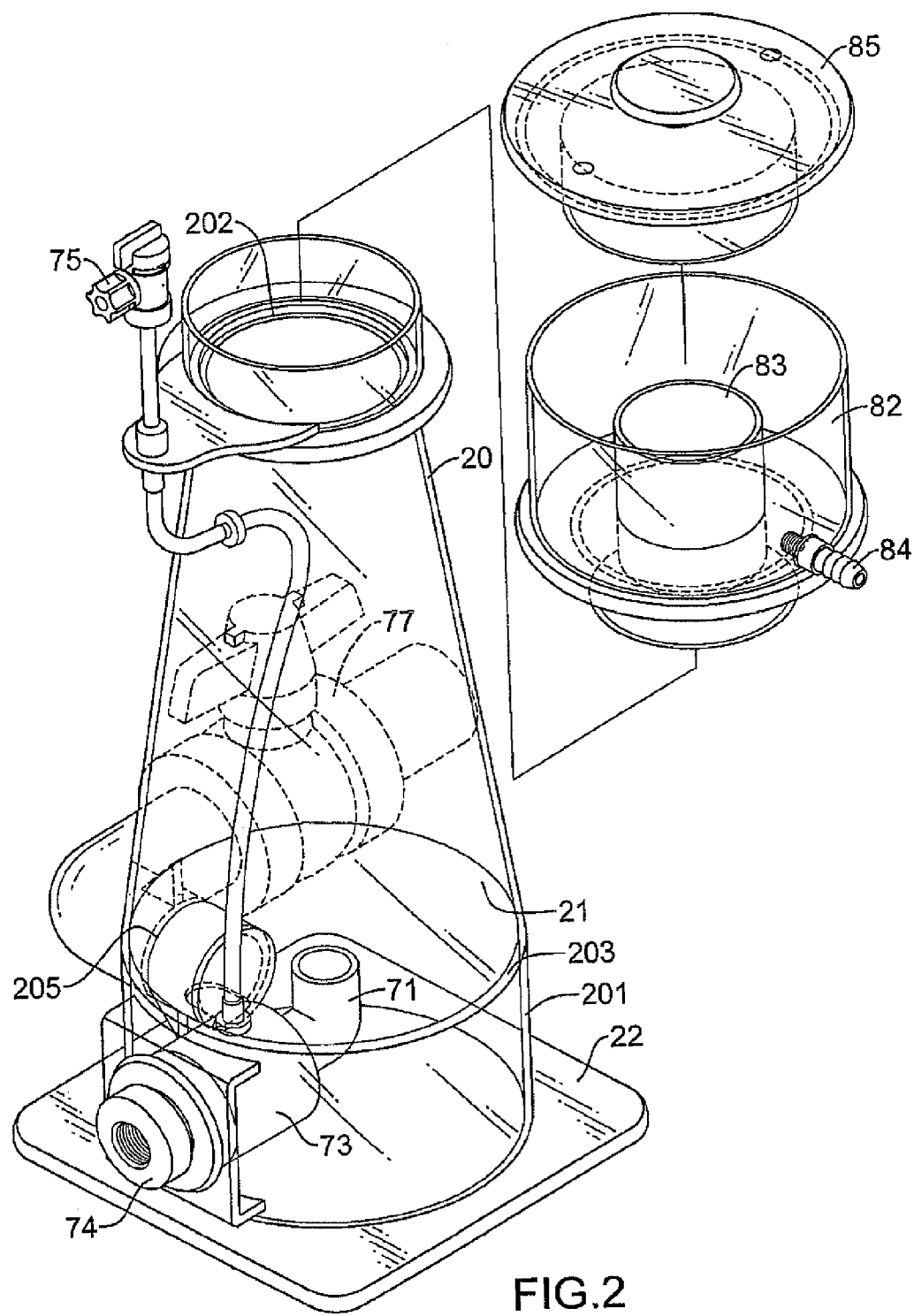
FIG. 2 is a partially exploded perspective view of the protein skimmer in FIG. 1.
Figure 3:
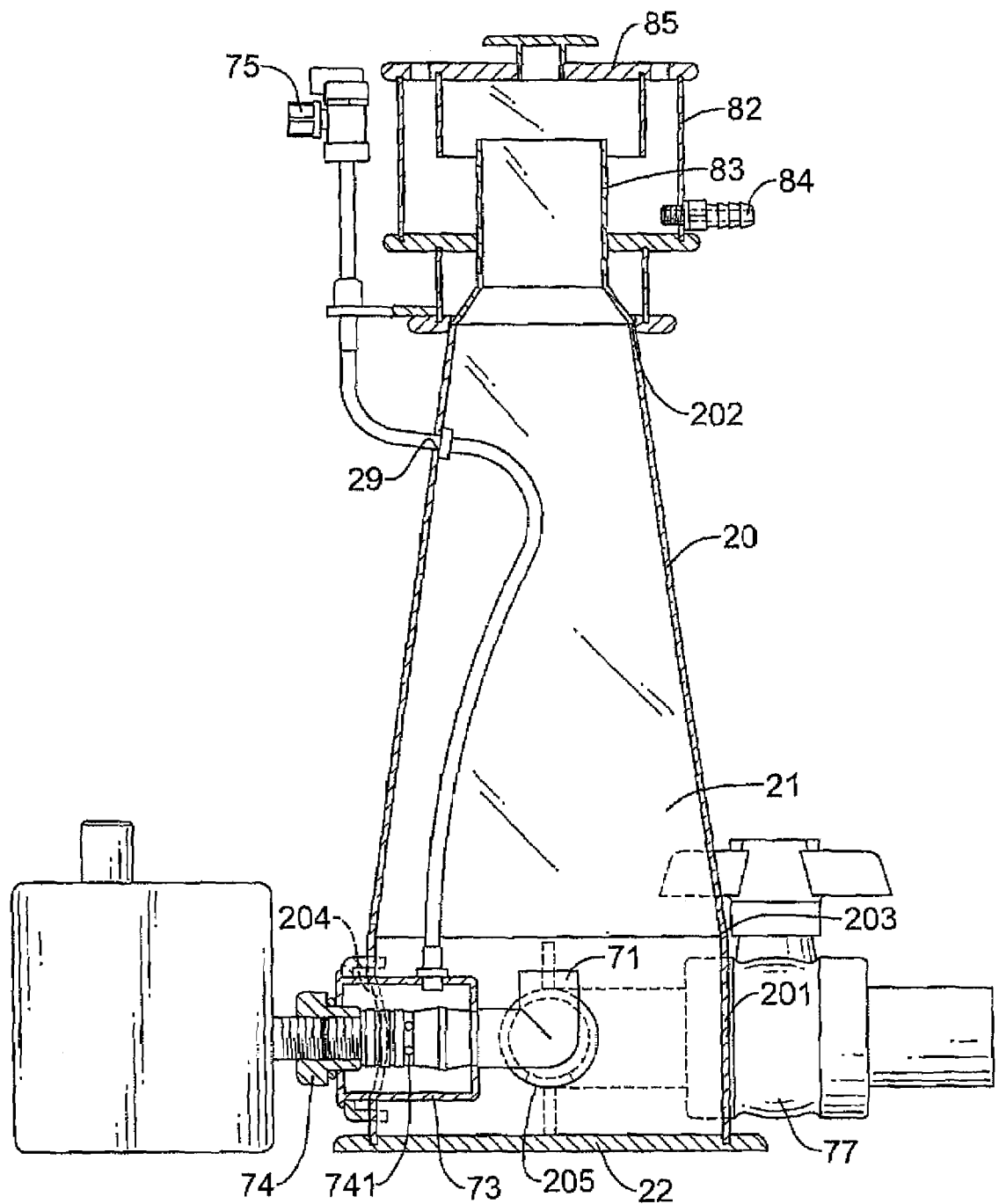
FIG. 3 is a side view in partial section of the protein skimmer in FIG. 1.

As it can be taken from FIGS. 1-3, the guide tube (20) according to the invention is tapered as a whole and comprises an upper end (202), a bottom end (203), a circumferential wall, a foam cavity (21) encircled by said circumferential wall and having a circular cross section, an optional cylindrical skirt (201) protruding downward from the bottom end 203 of the conical circumferential wall 20, and a base plate (22) closely adjacent to the bottom end of said conical circumferential wall 20.

As it can also be taken from FIGS. 1-3 and 5, the protein skimmer includes an inlet (204) and an outlet (205), formed through the skirt (201). The inlet (204) is provided with a nozzle (74) within the internal space encircled by the skirt (201), said nozzle (74) extending through an air chamber (73) and being provided with a plurality of air holes (741). The nozzle (74) and the air chamber (73) form a foam generating assembly.

Figure 5:
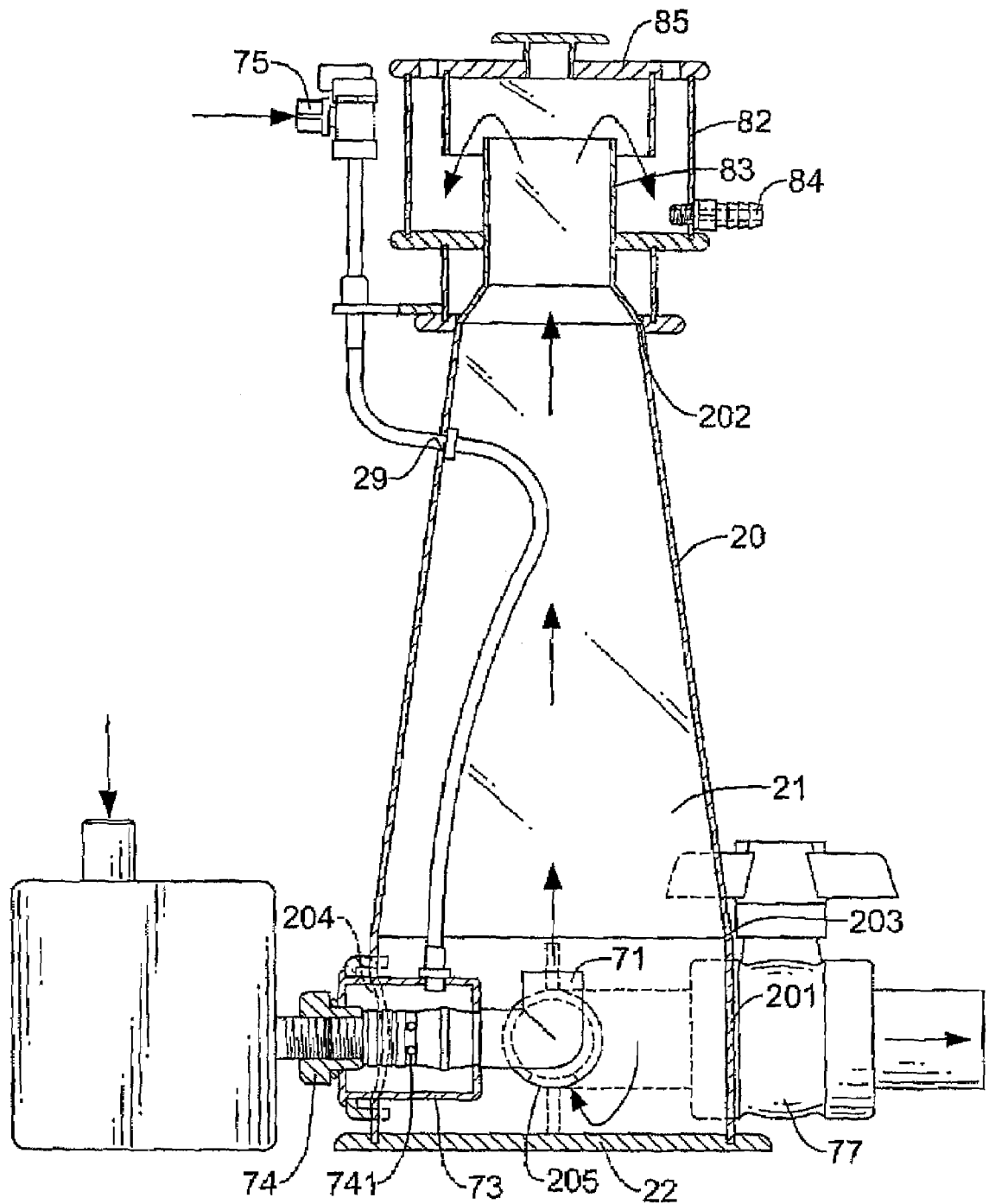
FIG. 5 is an operational view in longitudinal section of the protein skimmer in FIG. 1.

The embodiments of the nozzle (74) and the air chamber (73) as such correspond to the embodiments initially described by FIG. 5, so that insofar this description of the nozzle (74) and the air chamber (73) of the protein skimmer shown by FIG. 5 is referred to. In contrast to the described prior art, however, the nozzle (74) and the air chamber (73) according to the invention are arranged below the foam cavity (21) within the skirt (201).

Moreover, it can also be taken from FIGS. 1-3 and 5 that an inlet tube (71) bent in upward direction is connected to the outlet of the nozzle (74), the opening of said inlet tube (71) being arranged concentrically to the tapered circumferential wall 20 in the region of its bottom end 203, the water-bubble-mixture being vertically discharged in upward direction along the axis of the foam cavity into said foam cavity.

Figure 6:
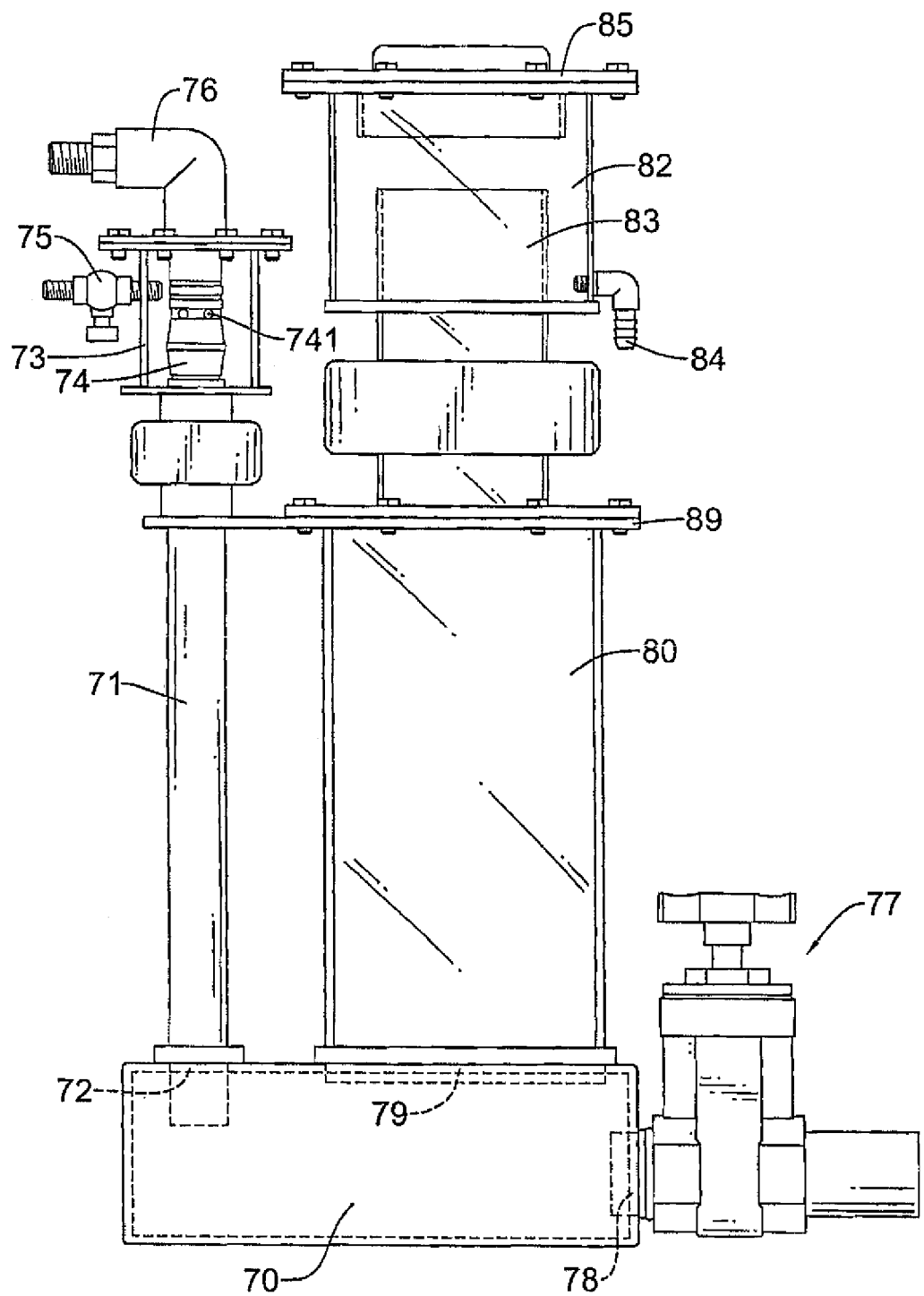
FIG. 6 is a side view of a conventional protein skimmer with a cylindrical guide tube in accordance with prior art mounted in said protein skimmer.

The upper end (202) of the guide tube, the opening angle of which moves in an angle degree of 15 to 20 in the shown embodiment, is self-facedly open on its inside and is connected to and communicates with a collecting assembly in the protein skimmer and specifically to an extension tube (83) in the collecting assembly. As shown, an upward tapered transition funnel with an opening angle in a range of 80 angle degrees may in this case be provided between the upper end (202) of the guide tube (20) and the bottom end of the collecting assembly. The collecting assembly may actually be formed like the collecting assembly shown in FIG. 6 in accordance with the description as initially stated, so that insofar this description is referred to.

The circumferential wall (20) of the guide tube is formed between the top end (202) and the bottom end (203), encircles the foam cavity which tapers toward the upper end (202) and has an optional mounting hole (29).

With further reference to FIG. 5, bubbles rising in the guide tube (20) are pressed closer and closer together by the tapered circumferential wall and gradually combine with each other to form lager bubbles. Consequently, fewer bubbles burst and release impurities into the water until the bubbles spill over into the collection reservoir (82), which improves the filtering efficiency of the protein skimmer.

The mounting hole (29) is formed through the circumferential wall to allow an air tube to connect to an air chamber (73) of the foam generating assembly.

The foam cavity (21) is formed inside the guide tube (20) and communicates with the upper end (202).

The skirt (201) is cylindrical, is formed on and protrudes downward from the bottom end (203) of the guide tube (20) and has a bottom edge, an inlet (204) and an outlet (205). The inlet (204) is formed through the skirt (201) to allow an inlet tube (71) or a nozzle (74) to extend into the skirt (201). The outlet (205) is formed through the skirt (201) to allow valve (77) to connect to the skirt (201).

The base plate (22) is mounted below and closes the bottom end (203) of the guide tube (20) and can be mounted on the bottom edge of the skirt (201).

By the circumferential wall of guide tube (20) being substantially tapered, any obstruction in the guide tube (20) to bubbles rising in the foam chamber (21) is removed, which allows more bubbles to enter the collecting assembly before releasing impurities and suspended particles included in the bubbles. Therefore, the filtering efficiency of the protein skimmer is improved significantly.

Even though numerous characteristics and advantages of the invention have been set forth in the foregoing description, together with details of the structure and function of the protein skimmer according to the invention, the invention is not restricted to the description in the text and in the drawing.

The invention claimed is:

1. A protein skimmer for filtering and cleaning water in an aquarium, comprising a foam generating assembly having an air chamber and a nozzle in said air chamber, the nozzle being provided with a plurality of air holes and being connected to a foam discharge tube, said foam discharge tube communicating with a foam cavity within a vertical guide tube for foam, said guide tube generally being tapered as a whole and comprising:

an open upper end connected to a collecting assembly;
   a bottom end;
   a hollow cone-shaped circumferential wall extending from the bottom end up to the upper end of the guide tube and encircling the foam cavity to define the foam cavity therein to taper throughout the length of the guide tube from the bottom end toward the upper end of the guide tube and to communicate with the upper end, and
   a cylindrical skirt being formed on and protruding downward from the bottom end of the guide tube and having an inlet of the foam generating assembly formed through the skirt and having the nozzle, the air chamber, and the foam discharge tube below the foam cavity within the skirt, said foam discharge tube being bent upward, and an outlet of the guide tube formed through the skirt;
   wherein said foam discharge tube comprises a discharge opening located concentrically to the cone-shaped circumferential wall at the bottom end of the guide tube to discharge foam generated in the foam generating assembly in an upward direction concentrically into the tapering foam cavity.

2. The protein skimmer as claimed in claim 1, wherein the circumferential wall has a mounting hole formed through the circumferential wall, an air tube passing through said mounting hole and being connected to the air chamber within the skirt.

\* \* \* \* \*